(12) United States Patent
Varaprasad

(10) Patent No.: US 8,449,704 B2
(45) Date of Patent: May 28, 2013

(54) METHOD OF MAKING A COATED GLASS ARTICLE, AND INTERMEDIATE PRODUCT USED IN SAME

(75) Inventor: Desaraju V. Varaprasad, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 861 days.

(21) Appl. No.: 12/222,071

(22) Filed: Jul. 31, 2008

(65) Prior Publication Data
US 2010/0024953 A1    Feb. 4, 2010

(51) Int. Cl.
*B32B 17/06* (2006.01)

(52) U.S. Cl.
USPC .............................. 156/99; 156/109; 427/154

(58) Field of Classification Search
USPC ..................... 156/99, 109; 427/154
See application file for complete search history.

(56) References Cited

U.S. PATENT DOCUMENTS

| | | | |
|---|---|---|---|
| 3,551,371 A * | 12/1970 | Weindel | 524/187 |
| 4,710,426 A | 12/1987 | Stephens | |
| 4,728,572 A | 3/1988 | Davis | |
| 4,894,276 A | 1/1990 | Bryant | |
| 5,026,597 A | 6/1991 | Franz et al. | |
| 5,041,482 A | 8/1991 | Ornsteen et al. | |
| 6,233,972 B1 | 5/2001 | Foster et al. | |
| 6,447,891 B1 | 9/2002 | Veerasamy et al. | |
| 6,461,731 B1 | 10/2002 | Veerasamy et al. | |
| 6,514,620 B1 | 2/2003 | Lingle et al. | |
| 6,524,714 B1 | 2/2003 | Neuman et al. | |
| 6,531,182 B2 | 3/2003 | Veerasamy et al. | |
| 6,576,349 B2 | 6/2003 | Lingle et al. | |
| 6,602,608 B2 | 8/2003 | Stachowiak | |
| 6,632,491 B1 | 10/2003 | Thomsen et al. | |
| 6,663,753 B2 | 12/2003 | Veerasamy et al. | |
| 6,682,773 B2 | 1/2004 | Scriven et al. | |
| 2002/0184841 A1 | 12/2002 | Diamond | |
| 2005/0196622 A1 | 9/2005 | Laird et al. | |
| 2006/0065350 A1 * | 3/2006 | Richardson et al. | 156/99 |

FOREIGN PATENT DOCUMENTS

| | | |
|---|---|---|
| EP | 1 380 553 | 1/2004 |
| FR | 2 272 961 | 12/1975 |
| WO | WO 2004/007387 | 1/2004 |
| WO | WO 2008/153622 | 12/2008 |
| WO | WO 2009/023149 | 2/2009 |

OTHER PUBLICATIONS

U.S. Appl. No. 10/811,309, filed Mar. 29, 2004, Richardson et al.
U.S. Appl. No. 10/797,561, filed Mar. 11, 2004, Nunez-Regueiro et al.
Permacel 5057A, Surface Protection Film Tape (1pg).
International Search Report dated Aug. 25, 2008.

* cited by examiner

*Primary Examiner* — Katarzyna Wyrozebski Lee
*Assistant Examiner* — John Blades
(74) *Attorney, Agent, or Firm* — Nixon & Vanderhye P.C.

(57) ABSTRACT

A temporary protective coating is provided over a coated glass substrate. The temporary protective coating includes a hot melt adhesive and is preferably applied in liquid form then solidified on the substrate. Moreover, the temporary protective coating can be easily removed by simply peeling it off. In certain example embodiments, the temporary protective coating is applied after heat treatment and is removed by peeling it off before the coated substrate is coupled to another substrate to form a window unit such as an IG window unit or a laminated vehicle windshield.

16 Claims, 3 Drawing Sheets

METHOD OF MAKING A COATED GLASS ARTICLE, AND INTERMEDIATE PRODUCT USED IN SAME

This invention in certain example instances relates to a method of making a coated glass article, which may also be heat treated. In certain example instances, a temporary protective polymer based layer is formed on a coated glass substrate and in the case of a heat-treatable product following heat treatment thereof (e.g., thermal tempering of the coated article), in order to enhance the mechanical and environmental durability of the heat treated thin film coating following the heat treatment process (e.g., during shipping, unloading, robotic handling and/or human handling of the heat treated coated article). The protective polymer based layer may be removed prior to, for example, the coated article being loaded into the insulating and/or laminating washer at a fabricator (e.g., IG window unit fabricator), and/or the protective polymer based layer may be removed prior to glass bending, tempering, and/or laminating. Typically, the temporary protective layer is easily removed by peeling it off.

BACKGROUND OF THE INVENTION

It is known in the art to use coated articles in the context of window units such as insulating glass (IG) window units. For example, see U.S. Pat. No. 6,632,491 to Thomsen, the disclosure of which is hereby incorporated herein by reference. In the '491 patent for example, a solar management coating (e.g., low-E coating) is provided on the inner surface of one of the glass substrates of an IG window unit so as to protect a building interior against infrared (IR) radiation and the heat generated thereby. Coated glass substrates of IG units often have to be heat treated (e.g., tempered), prior to IG unit assembly for example, to meet certain code requirements.

Large pieces of glass (whether heat treated or not) may have certain size-related problems related to handling. Large sheets of glass, for example, may be placed through operations relating to cutting, seaming, and/or edge deletion. In one or more of these operations, the surface of the glass may benefit from protection.

Following heat treatment (e.g., thermal tempering and/or heat bending), the heat treated coated glass substrate is often subjected to shipping, unloading, storage on a pallet or the like, robotic handling and/or human handling. One or more of these often tends to damage the heat treated coated glass substrate (e.g., via scratching, corrosion, and/or the like) before it can be coupled to another substrate to form an IG window unit, laminated window, or the like. Yields are reduced due to such damage which often occurs between heat treatment and coupling to another substrate.

For example, coated sheets are often scratched due to (a) rubbing up against other sheets or the like during shipment, unloading and/or storage; (b) pliers used by glass handlers; (c) abrasion caused by gloves worn by glass handlers; and/or (d) other types of rubbing/abrasion. Additionally, corrosion can be a significant cause of damage and is often caused by high humidity conditions, acid rain, and/or other materials which tend to collect on the coated articles during transport, storage and/or handling.

In view of the above, it can be seen that there exists a need in the art to better protect heat treated coated glass sheets in the processing stages following heat treatment and before coupling to another substrate. In particular, increased protection against mechanical abrasion and environmental damage is needed. Over the years, numerous attempts have been made in this regard.

The dusting of coated sheets with Lucor powder separator is often carried out in an attempt to better protect coated glass sheets in processing stages prior to heat treatment. Unfortunately, Lucor powder provides no protection against corrosion damage, and also is not particularly effective in protecting against scratch damage due to the use of pliers, brushes, gloves and the like.

Encapsulating of racks during shipment has also been tried. However, encapsulating racks is labor intensive and has proven only partially effective during shipment.

U.S. Pat. No. 6,682,773 to Medwick discloses a technique where a water-soluble temporary protective layer is applied to a coated glass sheet via a liquid solution. In particular, the protective layer is formed from an aqueous coating composition containing a polyvinyl alcohol polymer which is then dried and may thereafter be removed by washing in water. The technique of the '773 patent may be undesirable in that: (a) the coating is applied in liquid form and thus has to be dried using a sophisticated heat drying process which takes up valuable time and space; (b) the coating is typically water soluble and is removed by washing thereby leaving the coated sheet exposed to potential damage upon contact with water; and/or (c) the protective coating may have the tendency to absorb moisture in hot and/or humid conditions which may result in adhesive bonding to the protected glass. Thus, it can be seen that the technique of the '773 patent may be undesirable.

U.S. Pat. No. 4,710,426 to Stephens discloses a protective polymeric layer on a coated sheet. However, the isocyanate used in the '426 system prevents the protective polymeric layer from being practically removed in a reasonable manner.

EP 1 380 426 also discloses a temporary protective coating on a coated article. However, like the '773 patent, the protective coating of EP 1 380 426 burns off during heat treatment and thus provides no protection during the period after heat treatment when the coated article is subjected to damage/corrosion.

U.S. Patent App. Pub. No. 2006/0065350 to Richardson discloses a protective layer including polyethylene and an optional adhesive layer including acrylic. But these protective layers are limited in size and may not be applied on large sheets of glass, e.g., sheets larger than 100 inches.

Temporary protective coatings described in prior art are typically formed from solutions or dispersions of polymeric materials formed from polymeric materials or waxes. Whereas laminated protective films are removed by hand peeling, different removal techniques to remove temporary coatings may also include the use of organic solvents, water, steam, alkaline inorganic solvents, etc., and thermal decomposition by combustion at furnace temperatures.

Protective coatings formed from liquid precursors may be removed by hand peeling. But application of temporary coatings from liquid precursors may require a longer processing time and/or use of high temperatures to speed up film formation. Thus there exists a need for temporary coating materials which could be cost effectively applied and removed easily on demand by hand peeling process.

In view of the above, it can be seen that there exists a need in the art to better protect coated glass sheets in the processing stages following heat treatment (e.g., thermal tempering and/or heat bending), in particular between heat treatment and coupling of the coated article to another substrate. The protective layer(s) can be easily removed in a processing step prior to coupling the heat treated coated substrate to another substrate. In particular, increased protection against mechanical abrasion and environmental damage is needed between heat treatment and coupling to another substrate in order to improve yields and reduce the likelihood of damage.

BRIEF SUMMARY OF EXAMPLE EMBODIMENTS OF THE INVENTION

In certain embodiments of this invention, a temporary protective film is provided on a glass substrate that is coated with a multi-layer low-E coating. The temporary protective film includes one or more layers and is located on the glass substrate over at least the low-E coating.

In certain example embodiments, the temporary protective film is designed such that it can be applied over a low-E coating in an efficient manner without the need for any sort of lengthy curing procedure. In this regard, the temporary protective film is preferably applied (e.g., sprayed) in liquid or molten liquid form and cooled relatively quickly. Moreover, in certain example embodiments of this invention, the temporary protective film is designed such that it can be applied following heat treatment and be easily removed by simply peeling it off prior coupling the coated substrate to another substrate to form an IG window unit, laminated window, or the like. In certain example embodiments, the temporary protective film is designed such that it is not water soluble so that it remains on and protects the low-E coated glass substrate even upon exposure to water and other environmental elements involving humidity.

In certain example embodiments of this invention, there is provided a method of making an insulating glass (IG) window unit, the method comprising: sputtering a multi-layered low-E coating onto a glass substrate, wherein the low-E coating comprises at least one infrared (IR) reflecting layer comprising silver sandwiched between at least first and second dielectric layers; thermally tempering the glass substrate with the low-E coating thereon; after said tempering, applying a thermoplastic composition including a hot melt adhesive in liquid form to a top surface of the low-E coating and cooling the thermoplastic composition to form a protective sheet so as to create a protected coated article; peeling the protective sheet or film off of the low-E coating to form an unprotected coated article; and after peeling the protective sheet or film off of the low-E coating, coupling the tempered coated article including the glass substrate and low-E coating to another substrate to form an IG window unit.

In certain example embodiments of this invention, there is provided a method of making a protected coated substrate, the method comprising applying a thermoplastic composition including a hot melt adhesive in liquid form to a top surface of a substrate and cooling the thermoplastic composition to form a protective film so as to create a protected coated article, wherein the substrate comprises a portion of a solar power mirror or an energy efficient window.

In other example embodiments of this invention, there is provided a method of making a window unit, the method comprising: forming a multi-layer coating on a glass substrate; heat treating the glass substrate with the coating thereon; after said tempering, applying a thermoplastic composition including a hot melt adhesive in liquid form to a top surface of the low-E coating and cooling the thermoplastic composition to form a protective sheet so as to create a protected coated article; peeling the protective sheet off of the coating to form an unprotected coated article; and after peeling the protective sheet off of the coating, coupling the heat treated coated article including the glass substrate and coating to another substrate to form a window unit.

DETAILED DESCRIPTION OF EXAMPLE EMBODIMENTS OF THE INVENTION

Figure 1:
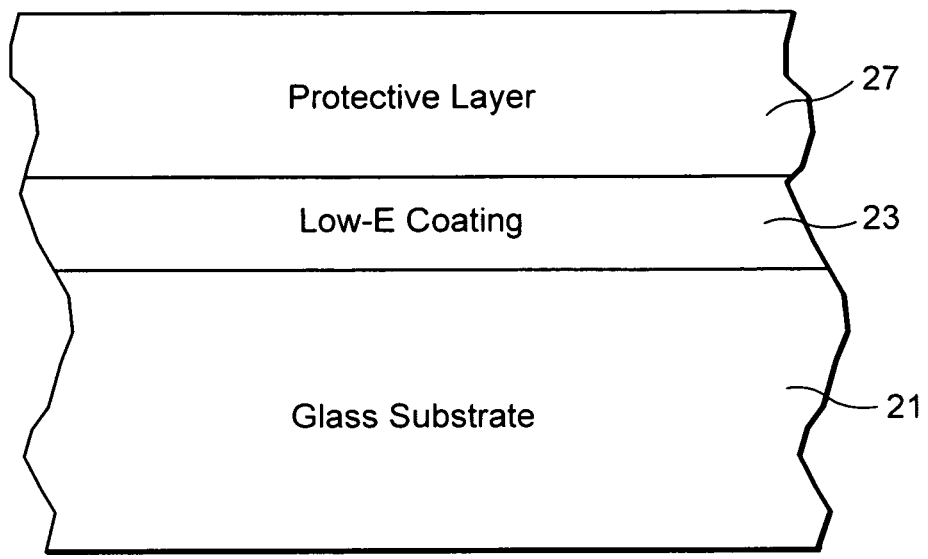
FIG. 1 is a cross sectional view of a coated article according to an example embodiment of this invention.

A temporary protective film, having one or more layers, is provided on a glass substrate that is coated with a multi-layer low-E coating in certain embodiments of this invention. The temporary protective film is typically provided on the substrate over a multi-layer low-E coating, where the low-E coating typically includes at least one infrared (IR) reflecting layer of a material comprising silver or the like. In certain example instances, the IR reflecting layer(s) may be sandwiched between at least a pair of dielectric layers.

Although described in connection with a multi-layer low-E coating, a protective layer in accordance with certain embodiments of this invention may be useful in a variety of applications, including, for example, surface protection of sensitive surfaces of coated glass used in concentrated solar power mirrors, energy efficient windows, etc. In certain embodiments, the substrate may be monolithic glass, such as those having SPF and/or UV-blocking properties and/or low-E or low-emissivity properties. UV-blocking properties refers to the capability of blocking at least a portion of the ultraviolet spectrum.

In certain example embodiments, the temporary protective film or coating is designed such that it can be applied over a low-E coating in an efficient manner without the need for any sort of extended curing procedure (e.g., without the need for an unduly long period of convective air drying, radiant heat drying, convective heat drying, heat drying, vacuum drying, and/or radiation curing such as UV, IR or RF curing). In this regard, the temporary protective coating is preferably applied as a hot melt/liquid that sets relatively quickly (e.g., upon contact with the substrate). For example, the temporary protective coating can be easily applied via spray coating or the like in an efficient and reasonable manner.

In certain example embodiments of this invention, the temporary protective coating is applied following heat treatment (e.g., thermal tempering and/or heat bending), and remains on the heat treated coated article until it is removed (e.g., by peeling it off) before the heat treated coated article is coupled to another substrate to form an IG window unit, laminated windshield, or the like. The temporary protective coating may be peeled off by hand (by an operator), or alternatively may be peeled off via a robot in certain other embodiments of this invention. Thus, certain example embodiments of this invention allow fabricators to more aggressively handle and/or process coated glass sheets after heat treatment and before coupling to another substrate without running a significant risk of damage. This permits yields to be increased, and costs cut.

In certain example embodiments, the temporary protective coating is not water soluble so that it remains on and protects the low-E coated glass substrate during post-HT shipping, storage, unloading, handling, and/or handling, before the heat treated coated article is coupled to another substrate. Thus, the coated sheet is not as susceptible to damage (e.g., scratching and/or corrosion) during such times.

FIG. 1 is a cross sectional view of an intermediate-stage coated article, following heat treatment, according to an example embodiment of this invention. The coated article of FIG. 1 is referred to as an "intermediate-stage" coated article because it typically exists during only a particular stage of the manufacturing process after heat treatment but before the heat treated coated article is coupled to another glass substrate to form an IG unit, laminated window, or the like. As shown in FIG. 1, the coated article includes a glass substrate 21 which supports a low-E coating 23. Provided on the substrate 21 over the low-E coating is a protective layer(s) 27 that is optionally adhered to the low-E coating via adhesive layer 25.

Low-E coating 23 may be any suitable type of low-E coating in different embodiments of this invention. For example, and without limitation, any of the coatings in any of the following U.S. patents may be used as the coating 23: U.S. Pat. Nos. 6,461,731; 6,447,891; 6,602,608; 6,576,349; 6,514,620; 6,524,714; 5,688,585; 5,563,734; 5,229,194; 4,413,877 and 3,682,528, all of which are hereby incorporated herein by reference. In certain example embodiments, the top layer of the low-E coating is of or comprises silicon nitride which may or may not be doped with a metal such as Al and/or stainless steel.

Protective layer 27 includes a hot-melt material and optionally other adjuvants (e.g., foaming agents, such as surfactants) in certain example embodiments of this invention. Protective layer 27 preferably utilizes hot melt materials that could be applied by conventional hot melt application techniques to form thin films as temporary protective coatings which could be removed by hand peeling. Removable hot melt coatings are used in applications such as pressure sensitive adhesives, etc. The thickness of layers in these applications are typically 25-250 microns. A description of suitable hot-melt materials may be found in U.S. Pat. No. 4,728,572 to Davis and U.S. Pat. No. 5,041,482 to Ornsteen, each of which is incorporated herein by reference. In certain example embodiments, the hot melt adhesive includes a styrene-isoprene-styrene block copolymer, a low softening point highly aliphatic resin and a metallic salt of a fatty acid. In certain example embodiments, suitable polymers may also include monomeric units of ethylene/vinyl acetate, polyethylene, polypropylene, polyester, and/or polyamide. In certain example embodiments of the present invention, the hot melt materials may be CI-8831 and/or CI-8831 M available from Coat-It, Inc, Detroit, Mich. In certain example, embodiments, protective layer 27 is applied using equipment from Nordson Corp.

The thickness of protective layer 27 may be at least 25-50 microns—or more preferably 50-250 microns in thickness—so as to facilitate removal by hand peeling. Foaming agents such as air and/or inert gas may also be mixed with the hot melt material prior to application in a liquid form. Suitable foaming agents may include, for example, sodium lauryl ether sulfate, sodium dodecyl sulfate, alkylaryl sulfonates, polyethoxyalkanols, and/or other well-known surfactants. Suitable inert gasses are those that do not react with the hot melt composition and may include, for example, ambient air, nitrogen, argon, etc. The addition of gas and/or foam may reduce the density of the resultant protective layer 27.

In certain example embodiments of this invention, protective layer 27 has a visible transmission of less than 70% (measured regarding all visible wavelengths of light), more preferably less than 60%, and most preferably less than 50% (thus, the optics of the coated article are typically undesirable when the protective layer 27 is thereon). In certain example instances, the protective layer 27 may be blue or otherwise colored. The blue or blue/green coloration of layer 27 is advantageous in that it allows edges of the layer 27 to be clearly seen by operators such as peelers, and also permits handlers to be able to easily determine whether or not the protective layer 27 is still on the coated substrate. This is helpful in preventing coated articles with a layer 27 thereon from being coupled to another glass substrate to form a final product such as an IG unit or the like before layer 27 has been removed by peeling or the like.

Figure 2:
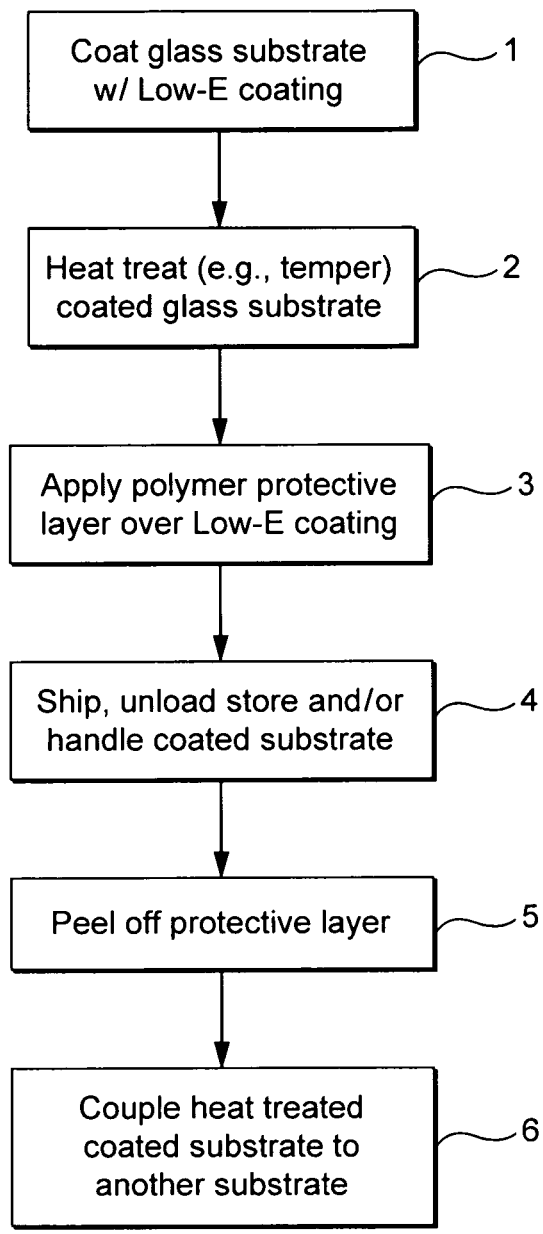
FIG. 2 is a flowchart illustrating certain example steps performed in an example embodiment of this invention.

FIG. 2 is a flowchart illustrating certain steps carried out according to an example embodiment of this invention during the manufacture of an IG window unit. With reference to FIGS. 1-2, first, a glass substrate 21 is coated with a low-E coating 23 (step 1). Example low-E coatings 23 which may be used are discussed above. The low-E coating is typically a multi-layer coating 23 which includes at least one IR reflecting layer of a material such as silver that is sandwiched between at least a pair of dielectric layers. The coating 23 is typically applied via sputtering or the like. After the coating 23 is applied to the glass substrate 21, the coated glass substrate is heat treated (e.g., thermally tempered and/or heat bent) (step 2). Thermal tempering (an example of heat treatment) typically involves heat treatment of a coated glass substrate using furnace temperature(s) of at least 580° C., more preferably of at least about 600° C. and still more preferably of at least 620° C. An example heat treating furnace temperature is from 600 to 700° C. This heat treatment (e.g., tempering and/or bending) can take place for a period of at least 4 minutes, at least 5 minutes, or more in different situations.

Then, following the heat treatment, protective layer 27 is applied to the top of the low-E coating 23 via spraying and cooling (step 3) to form the coated sheet shown in FIG. 1. After the protective layer 27 has been applied over the low-E coating 23, the coated article may be subjected to one or more of shipping to a fabricator, unloading from a shipment crate or pallet at the fabricator location, storage, and/or handling by an operator and/or robot (step 4). Optionally, in certain example embodiments of this invention, it is possible to coat or dust the coated articles with Lucor™ powder for purposes of protection even after the protective layer 27 has been applied. The Lucor spacer powder may help separate the coated sheets from one another during shipment to an IG unit fabricator and/or during storage with other coated articles.

In certain example embodiments, the protective layer(s) 27 remains on the heat treated coated article from the exit of the furnace line unloading until the coated glass substrate is loaded into the insulating and/or laminating washer at the fabricator (note: the furnace may be located at the glass manufacturer or at the fabricator). The protective layer 27 is removed by peeling it off just before this washer and thus just before being coupled to another glass or plastic substrate to form an IG window unit, laminated windshield, or the like (step 5). The heat treated coated article composed of substrate 21 and low-E coating 23 in monolithic form, may in certain example embodiments have a visible transmission of at least 40%, more preferably of at least 70%, after removal of the layers 25, 27. After the protective layer 27 has been removed, the coated sheet composed of glass substrate 21 and low-E coating 23 is coupled to another glass or plastic sheet via at least one spacer and/or sealant to form an IG window unit (step 6).

Figure 3:
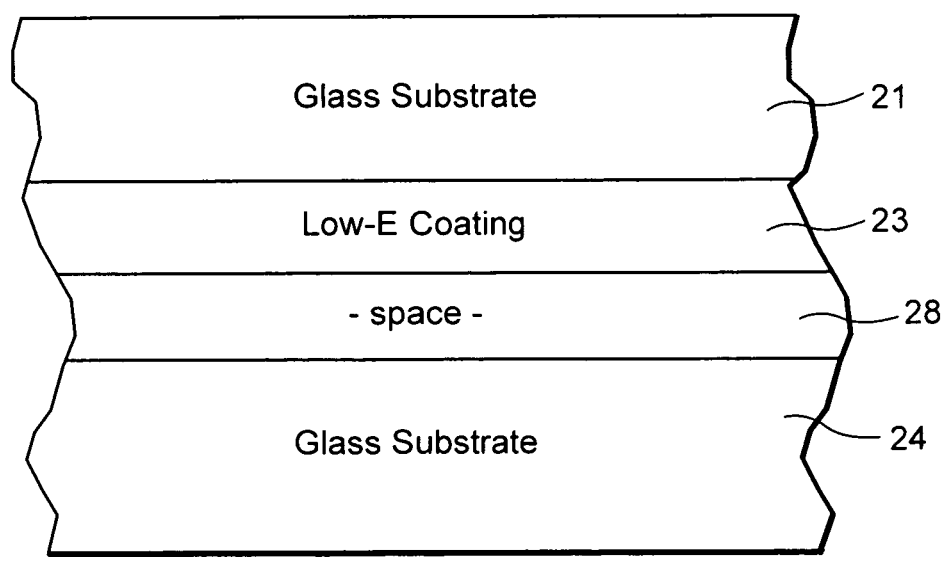
FIG. 3 is a cross section view of an IG window unit coated article according to an example embodiment of this invention.

Typically, an IG window unit may include two spaced apart substrates 21, 24 as shown in FIG. 3. Example IG window units are illustrated and described, for example, in U.S. Pat. Nos. 5,770,321, 5,800,933, 6,524,714, 6,541,084 and US 2003/0150711. FIG. 3 illustrates that an example IG window unit may include the coated glass substrate including glass substrate 21 and coating 23 coupled to another glass substrate 24 via a spacer(s) (not shown), sealant(s) (not shown) or the like with a gap 28 being defined therebetween. This gap 28 between the substrates in IG unit embodiments may in certain instances be filled with a gas such as argon (Ar), or alternatively may be filled with air. An example IG unit may comprise a pair of spaced apart clear glass substrates each about 4 mm thick, one of which is coated with a coating 23 herein in certain example instances, where the gap between the substrates may be from about 5 to 30 mm, more preferably from about 10 to 20 mm, and most preferably about 16 mm. In certain example IG unit embodiments of this invention, the coating is designed such that the resulting IG unit (e.g., with, for reference purposes, a pair of 4 mm clear glass substrates spaced apart by 16 mm with Argon gas in the gap) has a U-value of no greater than 1.25 W/(m$^2$K), more preferably no greater than 1.20 W/(m$^2$K), even more preferably no greater than 1.15 W/(m$^2$K), and most preferably no greater than 1.10 W/(m$^2$K). The IG window unit may have a visible transmission of from 50-80% in certain example embodiments of this invention, more preferably from 60-75%.

In view of the above, it can be seen that the protective layer 27 serves to protect the coated sheet from damage (e.g., scratching, corrosion and the like) during shipping, unloading, cutting, edge seaming and grinding, robotic handling and human handling. An example benefit is significantly higher fabrication yields for the product.

Figure 4:
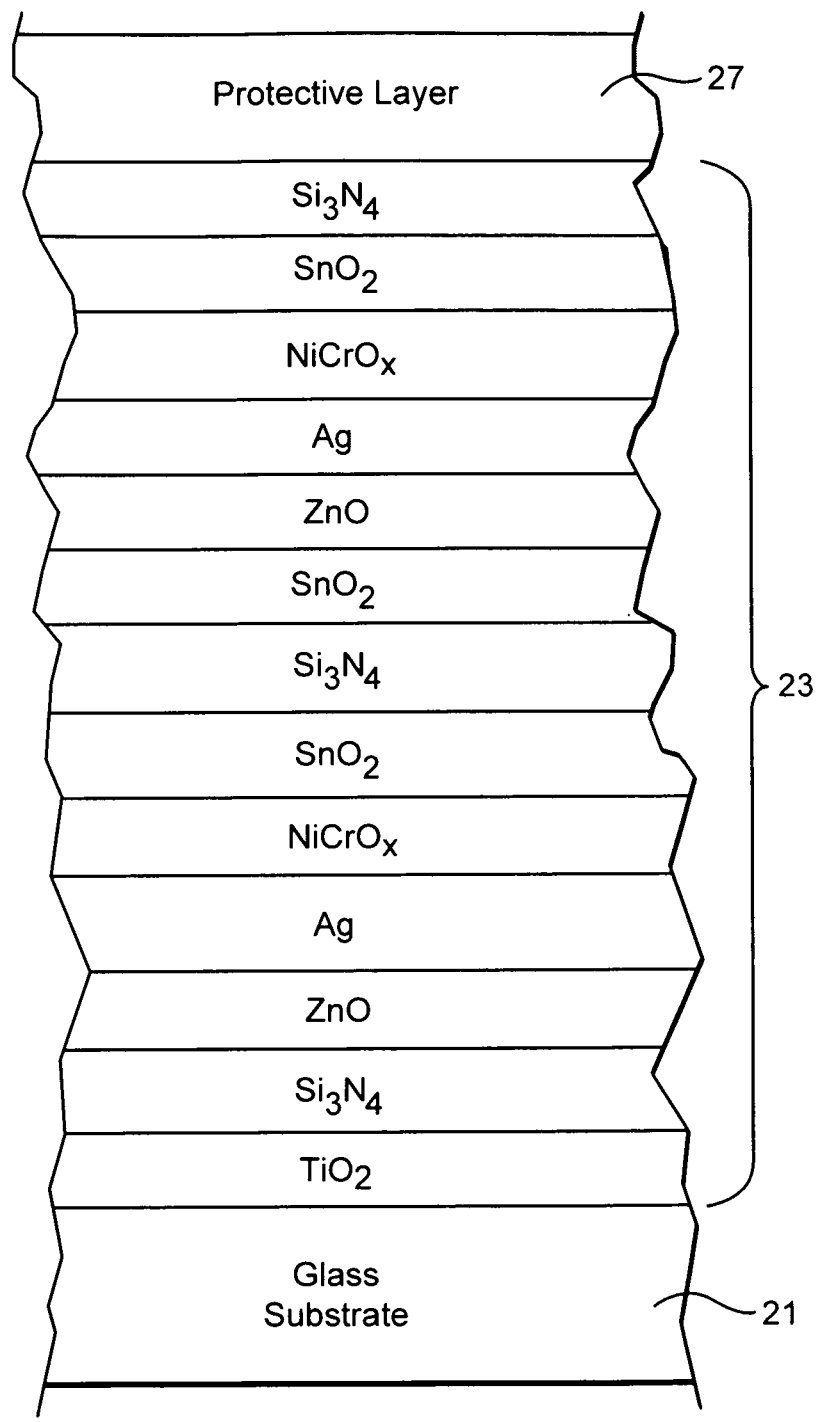
FIG. 4 is a cross sectional view of a coated article according to an example embodiment of this invention.

FIG. 4 illustrates protective layer 27 provided on a low-E coating 23 according to an example non-limiting embodiment of this invention. While any type of coating 23 may be used, the coating shown in FIG. 4 is provided for purposes of example, and includes first and second IR reflecting layers of silver with a number of dielectric layers provided therebetween. Other types of coatings (e.g., other low-E coatings, solar control coatings, mirror coatings, etc.) may instead be used between glass substrate 21 and temporary protective layer 27.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. Furthermore, all numerical values and ranges are approximate and include some variation and/or deviation therefrom.

The invention claimed is:

1. A method of making an insulating glass (IG) window unit, the method comprising:
   sputtering a multi-layered low-E coating onto a glass substrate, wherein the low-E coating comprises at least one infrared (IR) reflecting layer comprising silver sandwiched between at least first and second dielectric layers;
   thermally tempering the glass substrate with the low-E coating thereon;
   after said tempering, applying a thermoplastic composition in liquid form to a top surface of the low-E coating, wherein the thermoplastic composition consists essentially of a hot melt adhesive, and one or more of a metallic salt of a fatty acid, a foaming agent, a surfactant, an inert gas and resin, and cooling the thermoplastic composition to form a protective sheet so as to create a protected coated article;
   peeling the protective sheet off of the low-E coating to form an unprotected coated article;
   after peeling the protective sheet off of the low-E coating, coupling the tempered coated article including the glass substrate and low-E coating to another substrate to form an IG window unit; and
   wherein the thermoplastic composition comprises a foaming agent.

2. The method of claim 1, wherein an uppermost layer of the low-E coating comprises silicon nitride.

3. A method of making an insulating glass (IG) window unit, the method comprising:
   sputtering a multi-layered low-E coating onto a glass substrate, wherein the low-E coating comprises at least one infrared (IR) reflecting layer comprising silver sandwiched between at least first and second dielectric layers;
   thermally tempering the glass substrate with the low-E coating thereon;
   after said tempering, applying a thermoplastic composition in liquid form to a top surface of the low-E coating, wherein the thermoplastic composition consists essentially of a hot melt adhesive, and one or more of a metallic salt of a fatty acid, a foaming agent, a surfactant, an inert gas and resin, and cooling thermoplastic composition to form a protective sheet so to create a protected coated article;
   peeling the protective sheet off of the low-E coating to form an unprotected coated article;
   after peeling the protective sheet off of the low-E coating, coupling the tempered coated article including the glass substrate and low-E coating to another substrate to form an IG window unit; and
   wherein the thermoplastic composition comprises an inert gas.

4. The method of claim 1, wherein the protective sheet has a visible transmission of less than 70%.

5. The method of claim 1, wherein the IG window unit has a visible transmission of from 50 to 75%.

6. The method of claim 1, wherein the protective sheet is blue and/or green colored.

7. The method of claim 1, wherein the protective sheet is not water soluble.

8. The method of claim 1, wherein the protective sheet comprises ethylene/vinyl acetate, polyethylene, polypropylene, polyester, or polyamide.

9. A method of making a window unit, the method comprising:
   forming a multi-layer coating on a glass substrate;
   heat treating the glass substrate with the coating thereon;
   after said heat treating, applying by spray coating a thermoplastic composition including a hot melt adhesive in liquid form to a top surface of the coating and cooling the thermoplastic composition to form a protective sheet so as to create a protected coated article;
   peeling the protective sheet off of the coating to form an unprotected coated article;
   after peeling the protective sheet off of the coating, coupling the heat treated coated article including the glass substrate and coating to another substrate to form a window unit; and
   wherein the thermoplastic composition comprises a foaming agent.

10. The method of claim 9, wherein the coating is a low-E coating, and wherein an uppermost layer of the low-E coating comprises silicon nitride.

11. A method of making a window unit, the method comprising:
   forming a multi-layer coating on a glass substrate;
   heat treating the glass substrate with the coating thereon;
   after said heat treating, applying by spray coating a thermoplastic composition including a hot melt adhesive in liquid form to a top surface of the coating and cooling the thermoplastic composition to form a protective sheet so as to create a protected coated article;

peeling the protective sheet off of the coating to form an unprotected coated article;

after peeling the protective sheet off of the coating, coupling the heat treated coated article including the glass substrate and coating to another substrate to form a window unit; and wherein the thermoplastic composition comprises an inert gas.

12. The method of claim 9, wherein the protective sheet has a visible transmission of less than 70%.

13. The method of claim 9, wherein the IG window unit has a visible transmission of from 50 to 75%.

14. The method of claim 9, wherein the protective sheet is blue and/or green colored.

15. The method of claim 9, wherein the protective sheet is not water soluble.

16. The method of claim 9, wherein the protective sheet comprises ethylene/vinyl acetate, polyethylene, polypropylene, polyester, or polyamide.

* * * * *